INVENTORS
ALBERT G. ROSA
GEORGE W. BIRRER
BY

ATTORNEY

United States Patent Office 3,703,417
Patented Nov. 21, 1972

3,703,417
HEAT SEALED FLEXIBLE ENVELOPE SEPARATOR
AND BATTERY EMBODYING SAME
Albert G. Rosa, Placentia, and George W. Birrer, Westminster, Calif., assignors to McDonnell Douglas Corporation, Santa Monica, Calif.
Filed Sept. 11, 1969, Ser. No. 857,148
Int. Cl. H01m 3/00
U.S. Cl. 136—145                         16 Claims

ABSTRACT OF THE DISCLOSURE

Production of flexible envelope formed of flexible sheets heat sealed together along edge portions thereof, said flexible envelope having high resistance to alkali attack at elevated temperature over an extended period, the heat sealed bond being resistant to delamination of the bonded sheets and providing a strong bond, by heat sealing such flexible sheets, e.g. formed of a chrysotile asbestos (pure fuel cell grade), employing a sealant in the form preferably of a mixture of neoprene and polysulfone. The resulting flexible envelope can be coated with a flexible substantially inorganic film by dip-coating in a mixture preferably of a major portion of an inorganic or ceramic separator material, a minor portion of potassium titanate in short fiber form, and a minor portion of inorganic polymer, e.g. polyphenylene oxide, dissolved in a suitable solvent such as chloroform. The resulting porous chrysotile asbestos separator envelope heat sealed as described above and having a flexible coating thereon as described above, can serve as an electrode compartment for a battery electrode, e.g. a zinc electrode inserted therein, and such separator-electrode unit incorporated in a battery in side-by-side relation with other electrodes, such as silver electrodes, the flexible electrode compartment being resistant to shorting by penetration of electrode material into the sealed edge portions of the separator envelope.

---

This invention relates to production of heat sealed flexible sheet units, preferably in the form of a flexible envelope heat sealed along edge portions thereof, and which can be employed in producing an improved porous battery separator, and is particularly concerned with the heat sealing of flexible sheets, preferably pure fuel cell grade (chrysotile) asbestos sheets, along adjacent edge portions thereof to form a flexible envelope having improved resistance to alkali at high temperatures, and of improved bond strength at the sealed edge portions, and the additional treatment of such alkali and temperature resistant flexible envelope to form a flexible film of substantially inorganic separator material on such envelope, and thus provide an improved porous flexible battery separator and electrode compartment having low electrical resistivity and the aforementioned alkali and high temperature resistance properties, so that when incorporated in a battery, such as a high energy density silver-zinc battery, with an electrode inserted therein such separator has extended life due to reduced tendency of shorting by electrode species, e.g. zinc, penetration into the sealed edge portions, and the battery can be cycled over a long period of charge-discharge cycles, even when such battery is initially heated or sterilized at high temperature over an extended period of time.

The invention is also concerned with procedure for producing such flexible envelope, and with procedure for forming a flexible porous battery separator embodying such flexible envelope.

Batteries are an important source of energy storage for power generation. In addition to the common lead-acid storage battery, an important type of battery is the high energy density alkaline electrolyte battery such as the silver-zinc, silver-cadmium, nickel-cadmium, nickel-zinc and metal-air, e.g. zinc-oxygen battery. High energy density batteries are generally battery systems which have a substantially higher energy per unit of weight than conventional, e.g., lead-acid, storage batteries. Such high energy density batteries have many applications such as in portable tools and appliances, television, radio and record players, engine starting, portable X-ray units, and the like. In such batteries, it is conventional to employ a separator in the form of a porous member between the electrodes.

In high energy density batteries such as those noted above, the separator performs the function of retaining electrolyte, e.g., potassium hydroxide, separating the electrodes, and permitting transfer of electrolyte ions but preventing migration of electrode ions or growth of dendritic crystals of electrode ions which short circuit the battery.

Improved rigid inorganic separators in the form of certain aluminosilicates which are particularly suited for use in high energy density batteries are described, for example, in Pat. No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperature, e.g., of the order of 100° C. and above.

However, these rigid sintered separators present certain manufacturing, design and assembly problems. Thus, the production of the above-noted rigid inorganic separators, which are in the form of very thin membranes, requires a certain care in handling, packing and assembling in a battery to prevent cracking and breaking thereof. It has, therefore, assumed considerable importance to provide an inorganic separator which is readily produced and having the advantageous properties of the inorganic separators noted above, that is, having low resistivity, resistance to corrosive chemicals and operability at elevated temperatures, e.g. about 100° C., but which, in addition, is flexible and thus avoids the disadvantages of the rigid inorganic separators.

Further, the above inorganic separators or membranes are substantially rigid, and when employed in a battery between adjacent electrodes, e.g. zinc and silver electrodes, during operation of the battery, the electrodes, particularly the zinc electrode, tends to change shape and to move out of complete contact with the separator, thus reducing the electrical efficiency of the battery. Also, when employing the above-noted substantially rigid inorganic separators, it is necessary, when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short-circuiting of electrolyte from one electrode compartment around a separator and into the adjacent electrode compartment. Accordingly, a further particular area of interest has been the need for provision of flexible separators, preferably in the form of a bag or envelope which can serve as the electrode compartment and into which the battery electrode can be inserted.

In the copending application of Frank C. Arrance, Albert G. Rosa and Ronald J. Haas, Ser. No. 707,808, filed Feb. 23, 1968, now abandoned in favor of continuation application Ser. No. 154,218, filed June 17, 1971, there is described an improved flexible porous separator which can be box-shaped to provide a compartment for a battery electrode, produced by applying on a flexible porous substrate, such as flexible sheets or mats of various materials including potassium titanate paper, asbestos, aluminosilicate sheets, and the like, a film comprising a mixture of an inorganic separator material such as zirconia, and an organic polymeric bonding agent of various types, such as polyphenylene oxide, or a fluorocarbon polymer such as vinylidene fluoride polymer, bonding the particles of the inorganic material together with the bonding agent, substantially inorganic separator film on the flexible substrate. Although various types of flexible matrix materials are described for use in producing the flexible separator formed of the flexible porous matrix having the above described inorganic flexible film applied thereto, it has been found from testing and experience that the best matrix materials for this purpose are inorganic materials such as fibrous asbestos.

Although provision of the above noted flexible box-shaped electrode compartments or envelopes, which serve the dual purpose of providing an efficient separator and a compartment for the battery electrode has resulted in improved battery performance, it has been found that when employing sealants such as neoprene rubber, plastics such as epoxy resins and waxes for sealing adjacent sheets or mats of flexible material such as chrysotile asbestos along the edge portions thereof, to form the initial flexible envelope, the flexible electrode compartment formed by applying a flexible inorganic separator film to such flexible envelope tends to develop shorts at the seals due to nonuniform bonding at the joints or sealed edge portion of the flexible envelope or compartment. This is due to penetration of electrode material, such as zinc penetration or zinc dendrites in the seal areas. Such shorts also occur as a result of nonuniform bonding of the adjacent flexible sheets at the joints along the sealed edge portions. Further, it was found that conventional sealants of the types noted above are unsuitable due to delamination, distortion, incompatibility or reduced desistance to alkali such as KOH, as well as lack of bond strength, and inability to resist heat treatment or head sterilization at relatively high temperautres for long periods of time. Further, application of sealants such as epoxies in the usual manner for sealing the above flexible materials into the shape of an envelope or electrode compartment is time consuming and expensive.

It has now been found, according to the present invention, that the above noted problems and disadvantages can be sssentially solved, and the sealing of flexible porous sheets of material, such as sheets of asbestos, polypropylene, nylon and cellophane, provide a highly uniform and strong bond which is resistant to delamination of the bonded sheets and to distortion, and which is resistant to alkali and to elevated temperatures, by heat sealing the flexible sheets at predetermined areas thereof, e.g. along edge portions of mated flexible sheets, with a sealant consisting essentially of a mixture of neoprene and a member selected from the group consisting of polysulfone (hereinafter also referred to as PS) and polyphenylene oxide (hereinafter also referred to as PPO).

In preferred practice, flexible sheets, e.g. chrysotile asbestos (pure fuel cell grade) flexible sheets, are heat sealed together along edge portions thereof to form an envelope employing as heat sealant at such edge portions a combination or mixture of neoprene and polysulfone, e.g. a 50—50 mixture of each. This is accomplished by treating the edge portions of such sheets, e.g. chrysotile asbestos sheets, with a solvent solution of the mixture, mating the sheets together, drying the resulting unit to evaporate the solvent, and heat sealing the edge portions by suitable means, such as a well known impulse heat sealer unit.

It has been found that a flexible envelope formed by heat sealing as described above is not only highly resistant to alkali, e.g. KOH solution, and provides an improved bond at the heat sealed edge portions which is substantially more resistant to penetration of electrone species as compared to prior art sealants, but that such flexible envelope can be heated at temperatures of the order of 135 to 150° C., so-called heat sterilization temperatures, and is substantially unaffected at such high temperature exposure in the presence of alkali for a period substantially greater than 100 hours.

The above noted properties of the flexible envelope, e.g. formed of chrysotile asbestos, and heat sealed as described above, are essentially retained and an electrode separator envelope or compartment produced having low electrical resistivity, by further applying a flexible bonded substantially inorganic coating to the heat sealed flexible envelope, as is described more fully below.

Thus, for example, when the flexible envelope, e.g. flexible chrysotile asbestos envelope heat sealed as described above employing the polysulfone-neoprene or polyphenylene oxide-neoprene sealant noted above has applied thereto a composite zirconia based flexible inorganic separator film to produce a flexible battery separator compartment for insertion of an electrode, and such separator-electrode unit employed in a high energy density silver-zinc battery, such separator was found to be capable of withstanding heat sterilization for over 100 hours at temperature of the order of 135° C., and after sterilization the battery was cycled 33 times at 100% depth of discharge with no shorting or visible degradation of the sealant, and the sealed areas did not contain electrode materials, indicating no visible signs of shorting.

In carrying out the invention, the flexible sheets or matrix materials which can be employed and heat sealed according to the invention to produce the imported heat sealed flexible envelope, include any flexible material, either organic or inorganic, preferably the latter, of sufficient strength and porosity and having high resistance to alkali, e.g. potassium hydroxide, and to oxidation, and which provides an electrode compartment with high structural integrity. Thus for example, flexible sheets or mats of inorganic material such as potassium titanate paper, asbestos, aluminosilicate sheets or mats, can be employed, and also organic sheets or mats such as nylon, polytetrafluoroethylene (Teflon), polyphenylene oxide, polysulfone, polyethylene, polypropylene, cellophane, copolymers of vinyl chloride and acrylonitrile, and the like, in the form of sheets, mats or paper, can be employed. Flexible sheets of asbestos, polypropylene, nylon and cellophate are preferred, and it has been found that the use of pure fuel cell grade asbestos sheets or mats, that is, chrysotile asbestos, particularly produces a highly improved heat sealed electrode compartment or envelope in accordance with the invention.

As an essential feature of the invention, the above noted sealant composition is composed of a mixture of neoprene and polysulfone or a mixture of neoprene and polyphenylene oxide. Neoprene-polysulfone mixtures are preferred and appear to have better resistance to electrode species penetration, e.g. zinc dendrites, into the sealed areas of the flexible bag or electrode compartment produced according to the invention. The ratio of neoprene to the PS or PPO can be carried considerably, but generally the sealant mixture consists essentially of a mixture of from about 25 to about 75% of neoprene and about 75 to about 25% of PS or PPO, by weight. A 50/50 ratio by weight of the neoprene, and of the PS or PPO has been found advantageous. If desired, it will be understood that neoprene can be employed together with a combination of both PPO and PS, employing the above noted ranges of neoprene, and the combination of PPO and PS, e.g. a mixture of 50% neoprene and 50% of a combination of PPO and PS.

Polyphenylene oxide (PPO) is a commercially available material, a representative type thereof having a molecular weight range from about 25,000 to about 30,000, marketed by General Electric, and also polysulfone (PS) is a commercially available material, e.g. marketed by Union Carbide, a representative material of this type having a molecular weight range from about 22,000 to about 35,000. However, it will be understood that the molecular weights of the PPO and PS can vary substantially, and can be outside the above noted molecular weight ranges. The neoprene component is a well known commercially available material, e.g. available from Du Pont and the Acorn Cement Company, a division of Wilhold Glues.

The mixture of neoprene, and polysulfone or polyphenylene oxide, or a combination of both of the latter materials, is dissolved in a suitable solvent. Solvents which can be employed either alone or in any desired combination include for example chloroform, carbon tetrachloride, dimethyl acetamide, toluene, methylethylketone and hexane. The amount of solvent employed in producing the above sealant mixtures is such that the resulting sealant solution contains about 70 to about 95% solvent and about 5 to about 30% solids content composed of the above noted mixture of neoprene, and PS or PPO.

In preparing the sealant solution, in practice, the neoprene is first dissolved in a suitable solvent such as a mixture of toluene, methylethylketone and hexane, to form a solutoin, e.g. a neoprene solvent solution containing about 28% neoprene. The PS or PPO, or a combination thereof, is then dissolved in a suitable solvent, e.g. polysulfone resin in chloroform, to form a solution containing 7% polysulfone. The two solutions are then mixed to form a generally homogeneous mixture, for example the above noted neoprene solution containing 28% by weight neoprene and the above noted polysulfone solution containing about 7% polysulfone, are mixed so that the resulting combined solution contains equal amounts of neoprene and polysulfone by weight. The resulting solution can have a solids content from about 11 to about 13%. The solids ratio in the final solution can be further adjusted by addition of any of the above noted suitable solvents, preferably chloroform. It should be recognized that the resulting sealant solution can separate in two liquid phases depending on the nature of the solvents employed, but this is not harmful since a homogeneous mixture can be obtained again simply by stirring the solution. As previously noted, although the sealant solution can generally contain from about 5 to about 30% solids, preferably such solution contains from about 10 to about 20% solids.

The sealant solution can be applied to the flexible sheets or mats, e.g. chrysotile asbestos, used to fabricate the flexible envelope, in any suitable manner, as for example by brushing, dip-coating or filleting. However, brushing and dip-coating procedures are preferred. Generally, the sealant coat or film applied to the sheets has a thickness ranging from about 0.002″ to about 0.015″ in thickness, a representative thickness being about 0.005″.

A flexible envelope, electrode compartment or bag fabricated according to the invention employing the above noted sealant for sealing the edge portions of adjacent flexible sheets, is preferably fabricated by bonding two pieces or sheets of the preferred chrysotile asbestos paper together. The description of the invention described hereinafter is directed to such embodiment, although it will be understood that various designs of flexible envelopes including the use of any desired number of flexible sheets, for preparation of flexible electrode compartments or bags can be practiced within the scope of the invention, and hence the particular designs of the flexible bag or envelope described hereinafter are understood to be only exemplary.

The invention will be more clearly understood from the further description below of certain embodiments, taken in connection with the accompanying drawings, wherein.

The drawings are exaggerated for greater clarity.

Figure 1:
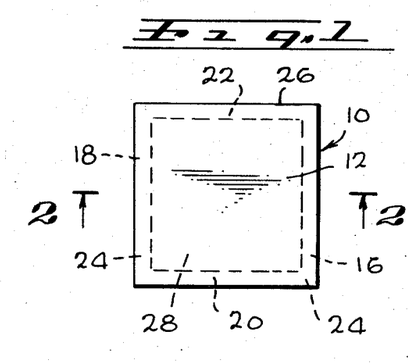
FIG. 1 is a plan view of a pair of flexible sheets mated together and sealed along their edge portions according to the invention to form a flexible envelope, and in which is inserted an electrode.
Figure 2:
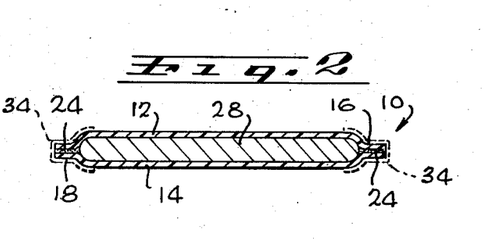
FIG. 2 is a cross-section taken on line 2—2 of FIG. 1.

Referring to the drawings, as illustrated in FIGS. 1 and 2, the flexible envelope or bag indicated at 10 is produced according to a preferred mode of procedure, from two sheets of flexible chrysotile asbestos, indicated at 12 and 14, each having a thickness, e.g. ranging from about 0.003″ to about 0.050″, and having the same shape or configuration and the same size, e.g. approximately square shaped. The sealant solution according to the invention, as described above, e.g. a solvent solution of neoprene and PS, is applied along the side edges 16 and 18 of each of the flexible sheets 12 and 14, and along the bottom edge portion 20 of each of sheets 12 and 14. It is only necessary to apply the sealant solution to one surface of each of the sheets 12 and 14. As previously noted, the sealant solution can be applied to the above noted edge and bottom portions of the flexible sheets 12 and 14, e.g. by brushing, or by dip-coating in the above noted sealant solution.

If desired, although not necessary, the sealant solution can also be applied along the upper edge portions 22 of each of flexible sheets 12 and 14 for subsequent sealing of such upper edge portions of the adjacent sheets 12 and 14 after an electrode has been inserted into the envelope, as described more fully hereinafter.

The two flexible sheets 12 and 14 are then mated together with adjacent faces containing the sealant film or coating along the edge portions 16, 18 and 20 of the two sheets, in contact with each other, and the adhered edge portions or areas are compressed together to obtain intimate contact between the two sheets.

The unit is then permitted to dry for an extended period of time, e.g. a period of about 4 to about 24 hours, at room temperature to completely remove solvent. Drying can be carried out at somewhat elevated temperatures, e.g. of the order of about 150 to about 250° F. as desired, to reduce the drying time. The resulting adhered edge portions 16, 18 and 20 are then heat sealed employing any suitable heat sealing means such as an impulse heat sealer of the type marketed at Quickseal Model 210 over a short period, e.g. about 3 to about 7 seconds. In employing such heat sealer, the joined or adhered edge portions of the flexible sheets 12 and 14 are placed between the heating element and the pressure bar of the heat sealer. As the pressure bar is lowered and contacts the surface of the flexible sheets, the heating element is energized for the above noted predetermined time, and is then automatically shut off. As heat is generated by the heating element, the sealant flows and is partially melted or softened, resulting in a uniform seal area and a high adhesive bond between the edge portions of the two flexible sheets. The unit is rotated until all of the joined edge portions of the two sheets have been heat sealed. The result is the porous flexible envelope or bag indicated at 10 and which is then opened at the top 26 to receive either a positive electrode such as a silver or nickel electrode, or a negative electrode such as a zinc or cadmium electrode, the inserted electrode, indicated at 28 being protected along its sealed edges by the adjacent sealed edge portions 16 and 18 and the bottom sealed edge portion 20 between the adjacent flexible sheets 12 and 14, forming the flexible envelope.

Although not essential, in preferred practice, as previously noted the top edge portions of the adjacent flexible sheets 12 and 14 are also adhered together by application of the above noted sealant solution tor the top adjacent surfaces of the respective sheets 12 and 14, either prior to or after treatment of the adjacent edge portions 16, 18 and 20 of the adjacent sheets with sealant solution, as noted above. Following insertion of the electrode, e.g. zinc electrode at 28, into the flexible bag, the sealant film along the top edge portions 22 of the adjacent sheets 12 and 14 is dried, and such top edge portions are heat sealed in the manner described above for heat sealing the edge portions 16, 18 and 20. As previously noted, however, heat sealing of the top edge portions of the envelope 10 is optional.

In producing a battery separator from the flexible preferably chrysotile asbestos, envelope or bag 10, such envelope 10 containing the electrode 28, as illustrated in FIGS. 1 and 2, is then treated with a mixture of a major portion of an inorganic material, and an organic polymeric bonding agent such as PPO. As described more fully below, in preferred practice, such envelope is treated with a mixture of a major portion of a particulate inorganic material, and preferably including a minor portion of potassium titanate, such potassium titanate preferably being in the form of short fibers, and a minor portion of a curable organic polymer capable of bonding the particles of the inorganic material, and which preferably also includes the potassium titanate fibers, together upon curing and forming a porous structure, such polymer being dissolved in a suitable solvent, and including removing the solvent and curing the polymer, such curing preferably being carried out at temperatures ranging from about 100 to about 550° F.

Thus, the flexible envelope 10 containing the electrode 28 is immersed in a slurry of the inorganic separator material, which is preferably formed of a solvent containing inorganic or ceramic separator material of any suitable type, such as those described hereinafter, and preferably chopped potassium titanate fibers, preferably of a size less than about 0.008" in length, mixed together in major and minor proportions respectively, to form a highly uniform mixture of the inorganic separator material and potassium titanate fibers, with an organic polymeric material incorporated with the inorganic or ceramic powders and having the property of bonding the individual particles of the inorganic material and potassium titanate fibers together upon curing of the organic polymer to result in a porous essentially inorganic film effective when used as a battery separator.

The inorganic separator material present as an essential component of the above noted slurry, can include a variety of porous inorganic or ceramic substances in powder or particulate form. Thus, for example, suitable inorganic separator materials include insoluble hydrous oxides such as the hydrous oxides of zirconium, titanium, antimony, tungsten, silicon, scandium, bismuth, vanadium, aluminum and cerium in particulate form. A preferred separator of this type is hydrous zirconium oxide or zirconia.

Other porous inorganic materials which can be employed for producing the separator according to the invention include particulate sintered aluminosilicates, especially the alkali metal and alkaline earth metal aluminosilicates, and alumina.

Other types of inorganic separator materials which can be employed include those in the form of a particulate sintered porous solid solution of magnesium silicate and a member selected from the group consisting of zinc silicate and iron silicate as described and claimed in Pat. No. 3,446,668, and which includes the naturally occurring magnesium-iron silicate solid solution known as the mineral Olivine, and the inorganic separator materials in the form of a particulate sintered porous solid solution of an aluminum-bearing material such as aluminum oxide, and a substance selected from the group consisting of chromium, cobalt, nickel, magnesium, calcium and iron-bearing materials, e.g., a mixture of alumina and chromic oxide, as described and claimed in Pat. No. 3,446,669.

Still another form of inorganic separator material which can be employed according to the invention are porous sintered separators consisting essentially of a solid solution of a major portion of magnesium oxide and a minor proportion of an oxide such as zirconium dioxide, chromic oxide, aluminum oxide, titanium oxide, and certain other oixdes, as described in copending application Ser. No. 727,394, filed May 8, 1968 of F. C. Arrance, et al., now Pat. No. 3,575,727.

Also inorganic separator materials derived from natural chromite, termed ferrochromite, and containing oxides of iron, magnesium, aluminum and chromium and formed into a sintered solid solution, as described and claimed in copending application Ser. No. 727,678 of F. C. Arrance, filed May 8, 1968, now Pat. No. 3,539,394, can be employed.

As further examples of inorganic separator materials which can be employed are sintered zirconia separators, e.g., calcia stabilized zirconia, sintered alumina and sintered thoria.

As a further example, inorganic separator materials formed from chome-iron and known as spinelloids and formed of $FeO-CrO_3$ and comprising, e.g. 35 to 50% chromic oxide, together with some silica as magnesium silicates, can also be employed.

Additional inorganic materials in particulate form which can be employed include silicates such as magnesium silicate (Fosterite), and the like.

Preferred inorganic separator materials are those selected from the group consisting of (a) a solid solution of magnesium silicate and iron silicate, (b) zirconia, (c) a solid solution of a major portion of magnesium oxide and a minor portion of an oxide selected from the group consisting of chromic oxide, zirconium dioxide, titanium dioxide and alumina, (d) a solid solution of ferrochromite, (e) spinelloids and (f) alumina. Most desirably the separator materials (a) and (b) above are employed.

The term "inorganic separator materials" or "sintered ceramic separator material," as employed herein, is intended to denote any of the above noted sintered inorganic separator materials.

When employed for producing the porous, flexible film applied to the flexible, e.g. chrysotile asbestos envelope described above, the inorganic separator material is in powder or particulate form.

It will also be understood that mixtures of the above inorganic materials can be employed in producing the flexible, porous separator film.

The organic polymeric materials incorporated with the inorganic or ceramic materials or powders noted above to produce the flexible separator film on the flexible, e.g. chrysotile asbestos, envelope heat sealed according to the invention, are preferably chosen from those curable polymers which have the property of bonding the individual particles of inorganic materials and the potassium titanate fibers together upon curing of the organic polymer, but do not fill the voids between the ceramic material and potassium titanate particles, so as to result in a porous structure effective when used as a battery separator. A preferred polymeric material which has been found particularly advantageous is the above noted polyphenylene oxide. Polysulfone can also be employed in admixture with the inorganic materials but results in a less porous flexible separator film of higher resistivity than when employing polyphenylene oxide. Also, polyamides such as nylon, neoprene rubber, polyepoxides, such as the polymer of bisphenol A and epichlorhydrin (the Epons), and fluorocarbon polymers such as vinylidene fluoride polymers (Kynar), and the copolymer of hexafluoropropylene and vinylidene fluoride (Viton) may be employed. In addition to having the properties of bonding the particles of inorganic material, and preferably also including potassium titanate, together so as to form a flexible, strong, thin membrane having suitable porosity for use as a battery separator, such polymers should be resistant to attack by chemicals such as alkaline solutions, e.g., potassium hydroxide solution, employed in high energy density batteries, both at ambient and at elevated temperatures.

The above-noted organic polymeric materials are employed in particulate or granular form, and mixtures of such polymeric materials also can be employed.

The relative proportions of inorganic or ceramic material, potassium titanate particles and organic polymeric binder employed for producing the flexible film on the heat sealed flexible envelope or matrix of the invention can vary. In preferred practice, the organic polymeric material is employed in minor proportions to obtain sufficient bonding and porosity, yet to afford substantial flexibility. Thus, for example, generally there can be employed from about 50% to about 95% of inorganic or ceramic powder, about 2% to about 35% potassium titanate fibers, and about 2% to about 48%, by weight, of organic polymeric material.

The organic polymer is dissolved in a voltatile solvent which dissolves the polymer and which has good volatility to permit quick removal from the coated film. Any suitable solvent having these characteristics can be employed. Thus, for example, chloroform, trichloroethylene, toluene, and mixtures of chloroform with carbon tetrachloride or with trichloroethylene can be utilized. The amount of solvent employed can vary, but generally the amount employed is such that the organic or polymeric solids content ranges from about 20 to about 70 parts per 100 parts by weight of solvent, the amount of solvent used being such that it is readily evaporated in a conveniently short time after film formation.

It has also been found advantageous to incorporate with a curable organic polymer employed in producing the flexible porous film, a minor portion of an organic component selected from the group consisting of monomeric and polymeric azelate, pelargonate and oleate esters. These materials are incorporated in the above noted solvent with the curable, organic polymer, employing a common solvent, e.g., chloroform, for both the curable organic polymer and the above noted organic component.

Typical examples of monomeric azelates, pelargonates and oleates, which can be employed, are di-2-ethylhexyl azelate, di-isoctyl azelate, and di-n-hexyl azelate; di-ethylene glycol dipelargonate, triethylene glycol dipelargonate, butanediol dipelargonate and 2-butoxyethyl pelargonate; tetra hydrofurfuryl oleate and diethylene glycol monooleate. Examples of preferred polymers are polypropylene and polyethylene polyazelates, particularly the former. These polymers or polyazelates generally have an average molecular weight range from about 850 to about 6,000.

The above noted monomeric and polymeric azelates, pelargonates and oleates are marketed as "Plastolein" by Emery Industries, Inc., of Cincinnati, Ohio.

The proportion of the above monomeric or polymeric ester present in the mixture thereof with the curable organic polymer, e.g., polyphenylene oxide, can vary, but usually ranges from about 5% to about 50% by weight of such mixture.

The slurry of inorganic or ceramic powder, e.g. sintered zirconia powder or solid solution of magnesium silicate and iron silicate, and preferably including potassium titanate particles, and the curable organic polymer, e.g., polyphenylene oxide, and also including the above noted monomeric or polymeric ester, e.g., azelate, when employed, dissolved in the solvent, is preferably maintained in vibration when the flexible, e.g. chrysotile asbestos envelope is dipped or immersed in the slurry, as in preferred practice. The vibration of such mixture results in obtaining a uniform coating of the mixture on such flexible envelope.

If desired, such slurry can be sprayed, brushed, or otherwise applied to the flexible, e.g. chrysotile asbestos, envelope 10. If spraying is employed, the amount of solvent employed in the slurry is increased to facilitate such spraying.

After the above noted slurry or mixture is applied as a coating to the flexible envelope 10, such flexible envelope or matrix containing such coating is subjected to air drying for solvent removal. The coating is then cured at temperatures which can range from about 100° to about 550° F., with the time of curing depending upon the particular polymer employed, the size of the particular surface area being covered, and other factors, including the temperature of cure. Curing time can range, for example, from about 10 to about 30 minutes, at the above elevated temperatures. Although air drying of the coated film for an extended period of time, e.g., of the order of about 24 hours or more, can eliminate curing at elevated temperatures, this is not preferred practice.

The thickness of the coating or film of bonded inorganic separator material formed on the flexible, e.g. chrysotile asbestos envelope 10, can range from a coating thickness of between about 0.001" and about 0.015", usually between about 0.003" and about 0.006".

The porosity of the flexible heat sealed separator compartment of the invention, e.g., in the form of a flexible chrysotile asbestos envelope or matrix, following application of the flexible inorganic separator film, can range from about 5% to about 35%, but such range is understood to be only exemplary.

Pore sizes or diameters of the final heat sealed flexible porous chrysotile asbestos mat or envelope following application of the flexible inorganic separator film, generally can range from about 1 to about 400, preferably about 5 to about 200, angstrom units, but can be outside this range.

Figure 3:
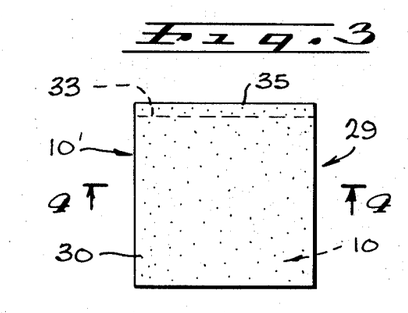
FIG. 3 is a plan view of the resulting flexible bag sealed along its edge portions according to the invention, and containing an electrode, as illustrated in FIG. 1, to which bag a flexible substantially inorganic coating has been applied.
Figure 4:
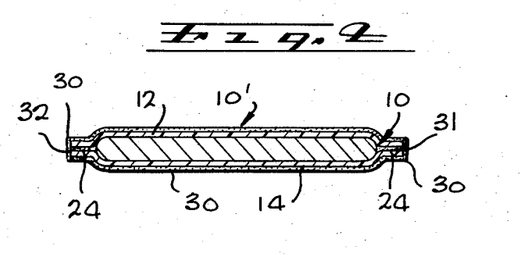
FIG. 4 is a cross-section taken on line 4—4 of FIG. 3.

The resulting flexible bag separator is illustrated at 10' in FIGS. 3 and 4, in which numeral 30 indicates the flexible substantially inorganic separator film or coating applied over the unit 10 comprising the flexible bag formed of the flexible sheets 12 and 14 heat sealed together at 24 and containing therein the electrode 28. It will be noted that the film or coating 30 covers the entire surfaces of the flexible bag including the outer surfaces of sheets 12 and 14 and the edge portions 31 and 32. However, if desired, the flexible envelope 10 can be dipped partially in the slurry of inorganic material and organic polymeric bonding agent, e.g. up to the dotted line indicated at 33 in FIG. 3, leaving the upper edge portion 35 untreated.

Figure 5:
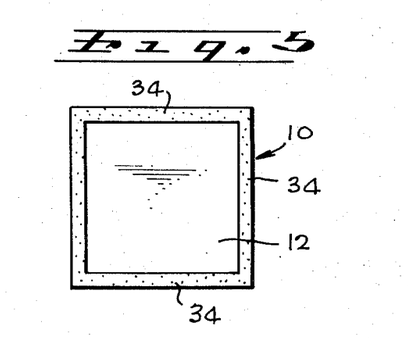
FIG. 5 illustrates an optional step or feature relating to overcoating the edge portions of the flexible bag of FIG. 1, with the sealant composition.

Referring to FIG. 5 of the drawing, if desired, following heat sealing of the edge portions 16, 18 and 20 of the flexible sheets 12 and 14, to form the flexible envelope and insertion therein of the electrode 28, as illustrated in FIGS. 1 and 2, and prior to application of the substantially inorganic film 30, as indicated in FIGS. 3 and 4, the outer surfaces of the edge portions 16, 18 and 20, and also 22, of each of the sheets 12 and 14, can be coated with the sealant composition noted above, and the sealant dried and heat sealed as described above, to form an additional protective sealant coating as indicated at 34 around the outer surfaces of such edge portions, followed by application over the entire outer surface of the flexible bag-separator unit of the substantially inorganic film 30, as described above. However, where the individual flexible sheets 12 and 14 are initially dip-coated, that is the edge portions 16, 18 and 20, and also 22, are dip-coated in the sealant solution in fabricating the flexible envelope, it will be noted that the sealant will be applied not only to the interior adjacent surfaces at 24 as shown in FIG. 2, but also necessarily to the outer surface edge portions of sheets 12 and 14, to form the additional protective sealant coat 34, as indicated also in dotted lines in FIG. 2.

Figure 6:
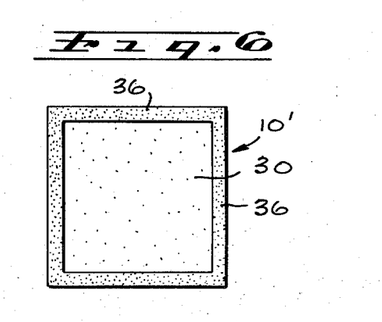
FIG. 6 illustrates another optional step applied to the flexible bag of FIG. 3 containing the inorganic coating thereon, and to which is applied along the edge portions an overcoat of sealant composition.

Further, if desired, following application of the flexible substantially inorganic separator film 30 to the flexible bag, as illustrated in FIGS. 3 and 4, an additional seal coat can be applied over the coating 30 on the outer surfaces of both of the flexible sheets 12 and 14, around the edge portions of the coated sheets 12 and 14 to provide an additional seal coat as indicated at 36 in FIG. 6. Thus, either or both of the additional protective seal coats 34 between the flexible bag surfaces and the inorganic coating 30, and 36 over the inorganic coating surface 30, can be applied to provide additional seal protection. However, it is to be understood that the application of the additional seal coats 34 and 36 is optional.

It will be understood also that the electrode 28 need not be inserted into the flexible bag 10 prior to application of the substantially inorganic coating or film 30 to the flexible envelope or bag, but rather the electrode can be inserted into the bag after application of the flexible inorganic film thereto, as indicated in FIGS. 3 and 4, followed by sealing of the top edge portions 22 of the flexible envelope, if desired, to completely enclose and insulate the electrode within the flexible separator compartment.

Further, if desired, the flexible sheets 12 and 14, prior to heat sealing to form the envelope described above, or subsequent to such heat sealing to form the envelope as illustrated in FIGS. 1 and 2, and prior to application of the flexible inorganic coating 30, particularly where employing chrysotile asbestos sheets or mats at 12 and 14, such sheets 12 and 14 or the resulting flexible envelope can be contacted with PPO, to substantially impregnate the mat with such PPO to thus further increase resistance of the flexible bag or envelope to alkali attack at elevated temperature over extended periods. Thus, for this purpose, the flexible sheets 12 and 14 or the heat sealed flexible envelope 10 can be immersed in a solvent solution of PPO having a concentration thereof ranging from about 0.5 to about 25%, followed by drying the so treated sheets or envelope to remove solvent, and curing the so impregnated PPO in the flexible sheets or envelope, in air at temperature ranging from about ambient up to about 350° F. In this manner, the flexible sheets or flexible envelope is substantially uniformly impregnated with about 0.50 to about 25% by weight of the PPO. However, it will be understood that such impregnation of the flexible sheets or flexible envelope with PPO is not essential but rather optional.

Employing the invention principles, it has been found that flexible envelopes particularly formed of chrysotile asbestos heat sealed according to the invention employing the above described neoprene-PS or neoprene-PPO sealant, and utilized as a battery separator by application of a film of flexible substantially inorganic separator material thereon, as described above, when employed as electrode compartments in batteries, particularly high energy density batteries such as silver-zinc batteries, resulted in substantially improved cycle life of the battery, at elevated temperature and particularly after heat sterilization at high temperatures for extended periods, without shorting by penetration of electrode species such as zinc dendrites in the sealed areas or edge portions indicated at 16, 18 and 20 in the drawing. Further, such sealed areas showed minimum delamination, distortion and degeneration by alkali, and maintained good bond strength, over such extended periods of operation.

On the other hand, flexible electrode compartments of the same type as noted above, but employing as sealants epoxy resins, PPO, PS, beeswax, rosins and neoprene, individually, for sealing the edge portions of the bag, have substantially reduced resistance to penetration of electrode species or dendrites into the sealed areas, resulting in shorting of the battery in a shorter period of operation, especially when operated at elevated temperature and after heat sterilization, as compared to the flexible heat sealed electrode compartment of the invention.

Any type of electrodes can be inserted into and insulated by the flexible separator compartment 10' produced according to the invention. These include the lead electrodes employed in conventional lead-acid batteries, and particularly electrodes employed in high energy density batteries such as silver, zinc, cadmium and nickel electrodes. The invention provides an improved battery separator particularly suitable for use in high energy density batteries such as silver-zinc, silver-cadmium, nickel-cadmium, nickel-zinc and metal-air batteries, using aqueous electrolytes, and for other battery systems such as those employing non-aqueous electrolytes such as propylene carbonate, butyrolactone, with such electrode couples as lithium-cupric chloride and magnesium-silver chloride.

During discharge of batteries such as those described and illustrated above, as is well known, e.g., in the case of a silver-zinc battery, the zinc converts to zinc oxide and the silver oxide to silver, and during charging of such batteries the silver is oxidized to silver oxide and the zinc oxide is reduced to zinc. Because of these reversible reactions, the terms "silver," "zinc," "cadmium," "nickel" and lead," referring to the metals forming the respective electrodes of silver-zinc, silver-cadmium, nickel-cadmium, nickel-zinc and lead-acid battery systems are intended to denote either the respective metals themselves or the corresponding oxides thereof.

Figure 7:
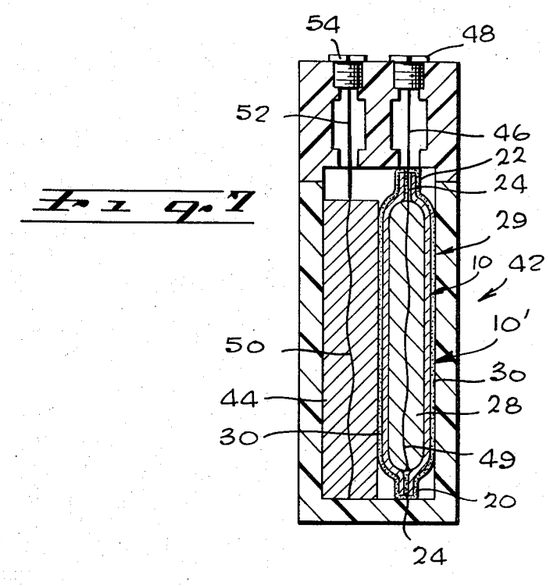
FIG. 7 shows a flexible porous separator envelope or bag in the form of an electrode compartment provided according to the invention, containing an electrode, as illustrated in FIG. 3, assembled in a single cell battery together with a conventional electrode.

The zinc electrode-flexible bag separator unit indicated at 29, in FIGS. 3 and 4 of the drawing, including the flexible separator bag 10' containing the zinc electrode 28, can be incorporated in a battery 42, as illustrated in FIG. 7, together with a conventional silver electrode 44, the unit 29 being disposed substantially in contact with the silver electrode 44, with an adjacent portion of the flexible film 30 of the separator envelope 10' being in contact with the adjacent surface of the silver electrode. The collector grid 49, usually incorporated into the zinc electrode, is connected by a lead 46 to an external terminal 48, and the collector grid 50 of the silver electrode is connected by means of a lead 52 to a terminal 54. If desired, the silver electrode 44 can also be inserted into a flexible separator envelope 10'.

Figure 8:
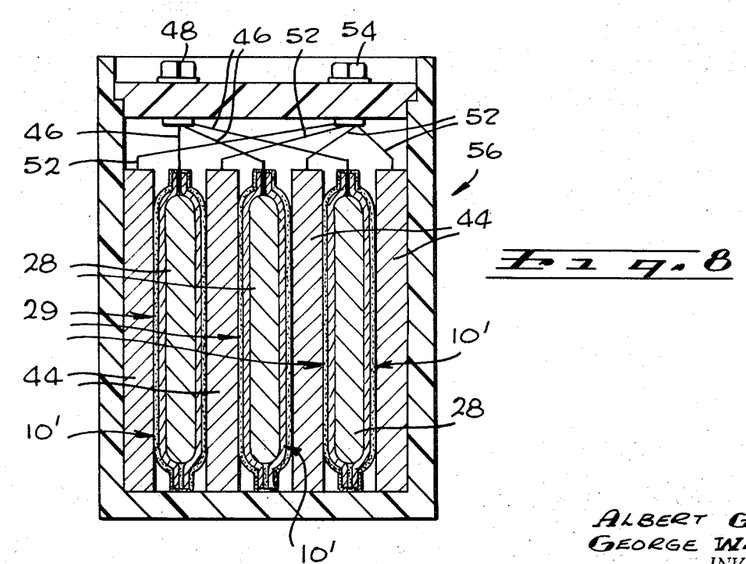
FIG. 8 illustrates an assembly of a plurality of the electrode-flexible separator units of FIG. 3, to form a multiplate battery.

FIG. 8 illustrates incorporation of the electrode-flexible separator unit according to the invention and illustrated at 29 in FIG. 3, in the form of a flexible separator envelope 10' containing zinc electrode 28, in a multiplate battery 56. In this arrangement, it is seen that three zinc-flexible separator units 29 including zinc electrode 28, according to the invention, are alternately disposed in relation to four silver electrodes 44, with a flexible film 10' of the respective envelope or electrode compartment separating adjacent zinc and silver electrodes 28 and 44 respectively. The leads 46 from the zinc electrode 28 are collectively connected to the terminal 48, and leads 52 from the silver electrodes 44 are collectively connected to the terminal 54.

The following are examples of practice of the invention.

EXAMPLE 1

Two pieces of substantially square shaped flexible chrysotile asbestos paper, each of substantially the same size, and having dimensions of 2.00" x 2.10", and having a thickness of about 0.010", are dipped in a solution of sealant containing a concentration of about 11% solids and composed of a mixture of about 50% neoprene and 50% PS. This solution is prepared by first dissolving PS resin in chloroform to form a 7% PS solution, and forming a separate solution of neoprene in a mixture of toluene, methylethylketone and hexane, to form a 28% neoprene solution, and combining these two solutions to form a combined 12% solution which contains the above noted equal amounts of the PS and neoprene.

The bottom edge, side edges and top edge of each of the above sheets are dipped into the above noted solvent solution to a depth of about 0.125 inch, to form a sealing edge portion around both sheets of about ⅛ inch in width. The edge coat of sealant is then dried for a period of about 2 minutes and the two sheets are again dipped into the sealing solution along the above noted edge portions, and dried for a period of about 5 minutes.

The two pieces of asbestos each having the above described edge coat of solvent are mated together as indicated in FIGS. 1 and 2 of the drawing, with their respective edge coats in contact, and are compressed at their seal coated side edge portions and bottom edge portions, to obtain intimate contact between the two bonded pieces at such edge portions.

After an additional period of drying of about 6 hours, the three sealed edges, that is the side edges and bottom edge portions as indicated at 16, 18 and 20 in the drawing, are heat sealed with an impulse heat sealer of the type Quickseal Model 210 using a 5 second heat pulse. Following such heat sealing, the resulting flexible bag is opened at the top and a zinc electrode is inserted.

The resulting heat sealed flexible chrysotile asbestos envelope containing the zinc electrode is dipped into a slurry under vibration and stirring, such slurry consisting of a solids mixture in chloroform consisting essentially of 76% of zirconium oxide powder, 4% of potassium titanate fibers chopped into short lengths of the order of about 0.008" or less, 10% polyphenylene oxide and 10% polypropylene polyazelate, marketed as Plastolein P-9750, and having an average molecular weight of about 2200. The PPO and polypropylene polyazelate are dissolved in the chloroform. Solids concentration of the slurry is about 60%.

The heat sealed flexible envelope containing the zinc electrode and having a coating of flexible substantially inorganic film forming material thereon is removed from the slurry, is air dried for 15 minutes to remove solvent and the coating is then oven cured for 15 minutes at 350° F.

The resulting flexible chrysotile asbestos separator envelope heat sealed as noted above, is coated with a flexible substantially inorganic film having a thickness of about 0.005", a porosity of about 10%, and has good strength.

This flexible separator envelope containing a zinc electrode, as illustrated in FIG. 3 and 4 of the drawing, is incorporated into a battery, e.g. as illustrated in FIG. 7 of the drawing, but containing two conventional silver electrodes, with the zinc electrode-flexible separator envelope unit produced as described above, disposed between and in contact with the two silver electrodes positioned on opposite sides thereof, with the opposite sides of the flexible separator envelope in contact with such silver electrodes.

Using 30% potassium hydroxide as electrolyte, the battery is subjected to a cycling regime including discharge at 0.5 a. (ampere) for one hour and charge at 0.2 a. for three hours, the cell capacity being 1.3 ah. (ampere hours).

Using such cycling regime, the above noted battery is cycled for 420 cycles at about 40% depth of discharge without observation or evidence of battery failure. Inspection of the heat sealed edge portions shows no evidence of zinc dendrites therein.

In addition, the battery sustains four months of charged wet stand, with good open circuit voltage of the order of about 1.86 volts following such wet stand period.

EXAMPLE 2

The procedure of Example 1 is repeated except that after assembly of the battery containing the heat sealed flexible separator-zinc electrode unit, the battery is subjected to heat sterilization for 180 hours at 135° C.

Results similar to those of Example 1 are obtained, with inspection of the sealed edge portions of the flexible separator bag showing no signs of adhesive loss and substantially no zinc material or zinc dendrites in the heat sealed edge portions.

EXAMPLE 3

The procedure of Example 1 is repeated except that in place of polysulfone resin employed in the sealing solution, polyphenylene oxide is employed in the same amount. Thus, in producing the sealant solution in Example 1, there is employed a 7% PPO solution in chloroform, which is combined with the 28% neoprene solution to form a combined 12% solution containing equal amounts of the neoprene and PPO.

Results similar to those of Example 1 are obtained, except that after the period of cycling as described in Example 1, it is observed that a small amount of zinc electrode peneration occurs in the heat sealed edge portions of the flexible envelope.

A comparison of the results of the present example with those of Example 1 indicates that the use of the neoprene-polysulfone sealant has greater resistance to electrode species penetration that neoprene-PPO sealant, but that both sealants are superior to those of conventional sealants, as described in Example 4 below.

EXAMPLE 4

Separate silver-zinc batteries assembled according to Examples 1 and 3 above, and containing flexible zinc electrode compartments in the form of chrysotile asbestos, heat sealed with the neoprene-PS and neoprene-PPO sealants respectively, and containing the flexible zirconium oxide separator coatings thereon, are compared with several batteries of the same type except that the edge portions of the chrysotile asbestos flexible separator compartments for the zinc electrode in the respective batteries are heat sealed respectively with PPO, PS, beeswax, rosin, and a combination of beswax and rosin.

In these tests, the batteries containing the respective heat sealed flexible bag separators containing the respective heat sealed flexible bag separators containing the respective zinc electrodes are continuously charged at 140 ma. against the silver counter electrodes. Charging is continued until seal failure occurs or zinc dendrites are observed emerging from the sealed areas.

The comparative results of these tests are set forth in the following table.

TABLE

| Sealant material: | Effect of battery operation on seals |
|---|---|
| PPO | Distorts the bonded area and zinc penetration in sealed areas. |
| Polysulfone | Distorts the bonded area and zinc penetration in sealed areas. |
| Beeswax | Loses bond between flexible envelope and separator coating, and zinc penetration in sealed areas. |
| Rosin | Loses bond between flexible envelope and separator coating, and zinc penetration in sealed areas. |
| Beeswax-rosin | Loses bond between flexible envelope and separator coating, and zinc penetration in sealed areas. |
| PPO-neoprene | Some tendency to be penetrated in sealed areas by zinc after 48 hours charging. |
| Polysulfone-neoprene | No penetration of zinc in sealed areas after 48 hours charging. |

From the above results it is seen that the use of the PPO-neoprene or PS-neoprene sealants and heat sealing the edge portions of the flexible chrysotile asbestos envelope or bag results in a strong bond at the sealed areas and substantially reduced, or avoidance of penetration of zinc dendrities into the sealed areas for up to 48 hours, whereas in the case of the other sealants, delamination and distortion of the bonded areas and loss of bond between the flexible bag and the separator coating occur, reducing the efficiency of the flexible bag separator and substantially reducing the life of the battery.

EXAMPLE 5

The procedure of Example 1 is repeated, except employing as sealant solutions, respectively, a solution containing a ratio of neoprene and PS solids of 30% neoprene and 70% PS; and a solution containing 60% neoprene and 40% PS.

Results similar to those of Example 1 are obtained.

EXAMPLE 6

The procedure of Example 1 is repeated except that in place of the zirconium oxide in the slurry for coating the flexible chrysotile asbestos envelope with a flexible substantially inorganic separator coating, there is employed the same amount, that is 76% of a particulate sintered solid solution of magnesium silicate and iron silicate.

The assembled battery containing the zinc electrode in the flexible envelope, with the two silver electrodes on opposite sides thereof is totally discharged at 1.0 a. to 1.0 v. (volt) and charged over an 18 to 20 hour period at 120 ma., five times a week. After about 33 cycles of such discharge-charge cycling regime, inspection of the sealed areas of the flexible bag containing the zinc electrode shows no adhesive loss or zinc electrode penetration.

On the other hand, employing the same battery but utilizing a flexible chrysotile asbestos electrode compartment for the zinc electrode, sealed using neoprene alone as sealant, zinc penetration occurs at the sealed areas after about 10 of the above noted cycles of operation. Further, seal integrity is nonuniform and adhesive failure is observed especially at the sealed corner areas.

EXAMPLE 7

The procedure of Example 1 is substantially followed, except that the flexible separator envelope containing the zinc electrode is assembled in a battery with two conventional nickel electrodes to form a nickel-zinc battery.

Results similar to those of Example 1 are obtained.

EXAMPLE 8

The procedure of Example 1 is substantially followed, except that instead of flexible chrysotile asbestos paper, there is employed flexible sheets of nylon, polypropylene and cellophane, respectively, of substantially the same size and dimensions as the chrysotile asbestos sheets of Example 1.

Results similar to those of Example 1 are obtained.

From the foregoing, it is seen that the invention provides an improved flexible envelope or bag heat sealed about its edge portions utilizing a sealant composed of neoprene, and PS or PPO, and on application of a bonded flexible inorganic separator film thereon, the resulting heat sealed and coated flexible envelope, preferably chrysotile asbestos, serves as an improved separator of reduced cost for insertion into the envelope of an electrode such as a zinc electrode, for use of the resulting flexible separator-electrode in a high energy density battery, such flexible separator envelope being resistant to alkali and to shorting by penetration of electrode species into the sealed areas, even upon heating the battery at elevated temperature over an extended period prior to operation of the battery.

While we have described particular embodiments of our invention for purposes of illustration within the spirit of the invention, it will be understood that the invention is not to be taken as limited except by the scope of the appended claims.

We claim:

1. A flexible porous battery separator having low electrical resistivity, high resistance to alkali attack at elevated temperature over an extended period, and extended life, which comprises a flexible envelope comprising flexible porous sheets heat sealed together along edge portions thereof with a sealant consisting essentially of a mixture of neoprene and a member selected from the group consisting of polysulfone and polyphenylene oxide to provide a highly uniform and strong bond, which is resistant to delamination of the bonded sheets and to distortion, and which is resistant to alkali and to elevated temperatures, said envelope containing a film comprising an inorganic separator material and a cured organic polymer bonding the particles of said inorganic material together, and forming a porous substantially inorganic separator film on said flexible envelope.

2. A flexible porous battery separator as defined in claim 1, said film consisting essentially of a major portion of an inorganic material, a minor portion of potassium titanate fibers, and a minor portion of a cured organic polymer bonding the particles of said inorganic material and said potassium titanate fibers together.

3. A flexible porous battery separator as defined in claim 1, said sheets being flexible chrysotile asbestos, and said sealant consisting essentially of a mixture of about 25 to about 75% neoprene and about 75 to about 25% polysulfone, by weight, said film consisting essentially of a major portion of an inorganic material, a minor portion of potassium titanate fibers, and a minor portion of a cured organic polymer bonding the particles of said inorganic material and said potassium titanate fibers together.

4. A flexible porous separator as defined in claim 2, wherein said organic polymer of said film is polyphenylene oxide, and said inorganic material of said film is selected from the group consisting of (a) zirconia and (b) a solid solution of magnesium silicate and a member selected from the group consisting of zinc silicate and iron silicate.

5. A flexible porous separator as defined in claim 3, wherein said organic polymer of said film is polyphenylene oxide, and said inorganic material of said film is selected from the group consisting of (a) zirconia and (b) a solid solution of magnesium silicate and a member selected from the group consisting of zinc silicate and iron silicate.

6. A flexible porous battery separator as defined in claim 1, wherein said inorganic material of said film is selected from the group consisting of (a) a solid solution oif magnesium silicate and a member selected from the group consisting of zinc silicate and iron silicate, (b) zirconia, (c) a solid solution of a major portion of magnesium oxide and a minor portion of an oxide selected from the group consisting of chromic oxide, zirconium dioxide, titanium dioxide and alumina, (d) a solid solution of ferrochromite, (e) spinelloids and (f) alumina.

7. A flexible porous separator as defined in claim 1, said sealant consisting essentially of a mixture of about 25 to about 75% neoprene and about 75 to about 25% of said member selected from the group consisting of polysulfone and polyphenylene oxide, and mixtures thereof, by weight.

8. A battery comprising a pair of electrodes of opposite polarity and positioned between said electrodes for retaining electrolyte, a flexible porous separator as defined in claim 1, said flexible envelope separator containing one of said electrodes.

9. A battery comprising a pair of electrodes of opposite polarity and positioned between said electrodes for retaining electrolyte, a flexible porous separator as defined in claim 5, said flexible envelope separator containing one of said electrodes.

10. A battery as degned in claim 8, including a plurality of said flexible envelope separator-electrode containing units, and a plurality of second electrode members arranged in side-by-side relation, with said flexible envelope separator-electrode containing units in alternating arrangement with said electrode members.

11. A battery comprising a pair of electrodes of opposite polarity and positioned between said electrodes for retaining electrolyte, a flexible porous separator as defined in claim 2, said flexible envelope separator containing one of said electrodes.

12. A battery comprising a pair of electrodes of opposite polarity and positioned between said electrodes for retaining electrolyte, a flexible porous separator as defined in claim 3, said flexible envelope separator containing one of said electrodes.

13. A battery comprising a pair of electrodes of opposite polarity and positioned between said electrodes for retaining electrolyte, a flexible porous separator as defined in claim 4, said flexible envelope separator containing one of said electrodes.

14. A battery comprising a pair of electrodes of opposite polarity and positioned between said electrodes for retaining electrolyte, a flexible porous separator as defined in claim 6, said flexible envelope separator containing one of said electrodes.

15. A battery comprising a pair of electrodes of opposite polarity and positioned between said electrodes for retaining electrolyte, a flexible porous separator as defined in claim 7, said flexible envelope separator containing one of said electrodes.

16. A battery as defined in claim 12, including a plurality of said flexible envelope separator-electrode containing units, and a plurality of second electrode members arranged in side-by-side relation, with said flexible envelope separator-electrode containing units in alternating arrangement with said electrode members.

References Cited
UNITED STATES PATENTS

| | | | |
|---|---|---|---|
| 2,934,585 | 4/1960 | Zahn | 136—147 |
| 3,226,260 | 12/1965 | Drengler | 136—30 |
| 3,542,596 | 11/1970 | Arrance | 136—6 |
| 3,014,835 | 12/1961 | Feigley et al. | 162—155 X |
| 3,441,474 | 4/1969 | Hutchins et al. | 162—155 |
| 1,942,668 | 1/1934 | Smith | 136—145 |
| 2,647,157 | 7/1953 | Booth | 136—147 |
| 2,866,841 | 12/1958 | Zahn | 136—147 |

ANTHONY SKAPARS, Primary Examiner

U.S. Cl. X.R.

136—147